US008170509B2

(12) United States Patent
Norris et al.

(10) Patent No.: US 8,170,509 B2
(45) Date of Patent: May 1, 2012

(54) INCIDENT AND REFLECTED SIGNAL PHASE DIFFERENCE DETECTION

(75) Inventors: George B. Norris, Gilbert, AZ (US); Joseph Staudinger, Gilbert, AZ (US)

(73) Assignee: Freescale Semiconductor, Inc., Austin, TX (US)

( * ) Notice: Subject to any disclaimer, the term of this patent is extended or adjusted under 35 U.S.C. 154(b) by 440 days.

(21) Appl. No.: 12/422,070

(22) Filed: Apr. 10, 2009

(65) Prior Publication Data

US 2010/0261442 A1 Oct. 14, 2010

(51) Int. Cl.
*H03C 1/52* (2006.01)
(52) U.S. Cl. ...................................... 455/115.4; 455/107
(58) Field of Classification Search ................... 327/2, 3; 324/637, 638, 642, 644; 455/107, 115.4, 455/226.4, 123
See application file for complete search history.

(56) References Cited

U.S. PATENT DOCUMENTS

| | | | | |
|---|---|---|---|---|
| 3,517,309 | A * | 6/1970 | Gerst | 324/84 |
| 4,493,112 | A * | 1/1985 | Bruene | 455/123 |
| 5,386,194 | A * | 1/1995 | Moehlmann | 324/650 |
| 5,550,506 | A * | 8/1996 | Tsumura | 329/304 |
| 6,756,849 | B2 | 6/2004 | Dupuis et al. | |
| 7,103,328 | B2 | 9/2006 | Zelley | |
| 7,151,382 | B1 | 12/2006 | Kean | |
| 7,221,181 | B2 * | 5/2007 | Chao et al. | 324/95 |
| 7,656,964 | B1 * | 2/2010 | DeCoste et al. | 375/297 |
| 7,831,226 | B2 * | 11/2010 | Kwon et al. | 455/121 |
| 7,937,051 | B2 * | 5/2011 | Vaisanen | 455/115.1 |
| 7,974,542 | B2 * | 7/2011 | Kagawa | 398/188 |
| 2006/0205375 | A1 * | 9/2006 | Vaisanen | 455/276.1 |
| 2007/0197180 | A1 * | 8/2007 | McKinzie et al. | 455/248.1 |
| 2008/0125061 | A1 * | 5/2008 | Kuriyama et al. | 455/127.1 |
| 2008/0186032 | A1 * | 8/2008 | Van Bezooijen et al. | 324/646 |

OTHER PUBLICATIONS

Keerti, A., et al., Dynamic Output Phase to Adaptively Improve the Linearity of Power Amplifier Under Antenna Mismatch, 2005 IEEE RFICSymposium, p. 675-678, Jun. 2005.
Qiao, et al. Real-Time Adaptation to Antenna Impedance Mismatch for Cdma Transceivers, IEEE Topical Workshop on Power Amplifiers for Wireless Communications, Jan. 2006 (UCSD, Nokia, Peregrine Semiconductor).

* cited by examiner

*Primary Examiner* — Thomas J Hiltunen
(74) *Attorney, Agent, or Firm* — Ingrassia Fisher & Lorenz, PC

(57) ABSTRACT

Embodiments include methods and apparatus for detecting a phase angle between an incident signal and a reflected signal. The apparatus comprises a plurality of phase shifters and additional circuitry. The plurality of phase shifters is adapted to apply first phase shifts to a representation of the incident signal and to apply second phase shifts to a representation of the reflected signal. The additional circuitry, which is operatively coupled to the plurality of phase shifters, is adapted to produce a first indication of a location of a relative phase difference between the incident signal and the reflected signal within a first region of a first reference circle, and to produce a second indication of the location of the relative phase difference within a second region of a second reference circle, wherein the second reference circle is rotated with respect to the first reference circle.

19 Claims, 5 Drawing Sheets

INCIDENT AND REFLECTED SIGNAL PHASE DIFFERENCE DETECTION

TECHNICAL FIELD

Embodiments relate to methods and apparatus for detecting phase differences between an incident signal and a reflected signal (e.g., a voltage standing wave ratio (VSWR)).

BACKGROUND

A transmitter lineup of a wireless communication device includes a power amplifier that has its output coupled to an antenna. Ideally, the input impedance of the antenna should match the output impedance of the power amplifier. However, the input impedance of the antenna is affected by external objects in its close vicinity, particularly metallic objects. This antenna characteristic may result in a significant impedance mismatch between the power amplifier and the antenna, under certain circumstances. Such an impedance mismatch causes radio frequency (RF) power to be reflected from the antenna input back into the power amplifier. This tends to reduce the power amplifier's linearity, RF output power, and efficiency.

Some devices include an isolator at the output of the power amplifier, which absorbs the reflected power, thus improving the linearity. However, an isolator is a relatively large and costly component, and its inclusion in a handheld device may undesirably add weight and size to the device. In addition, an isolator tends to limit the transmitted power under mismatch. Accordingly, isolators are not particularly desirable for use in handheld devices. Another technique for addressing impedance mismatch issues includes adjusting the drive level at the input of the power amplifier so that the output voltage swing can be reduced. However, this technique has the drawback of significantly reducing the transmitted RF output power.

DETAILED DESCRIPTION

Embodiments described herein include detecting phase differences between an incident signal and a reflected signal. For example, embodiments may include methods and apparatus for detecting phase differences between incident and reflected signals at an interface between an antenna and a power amplifier of a wireless communication device. The various embodiments may provide one or more advantages over traditional systems. For example, embodiments include space and weight efficient methods and apparatus for detecting phase differences resulting from antenna mismatch effects, which information may be used to compensate for the mismatch without significantly affecting a power amplifier's linearity, RF output power, and/or efficiency.

Figure 1:
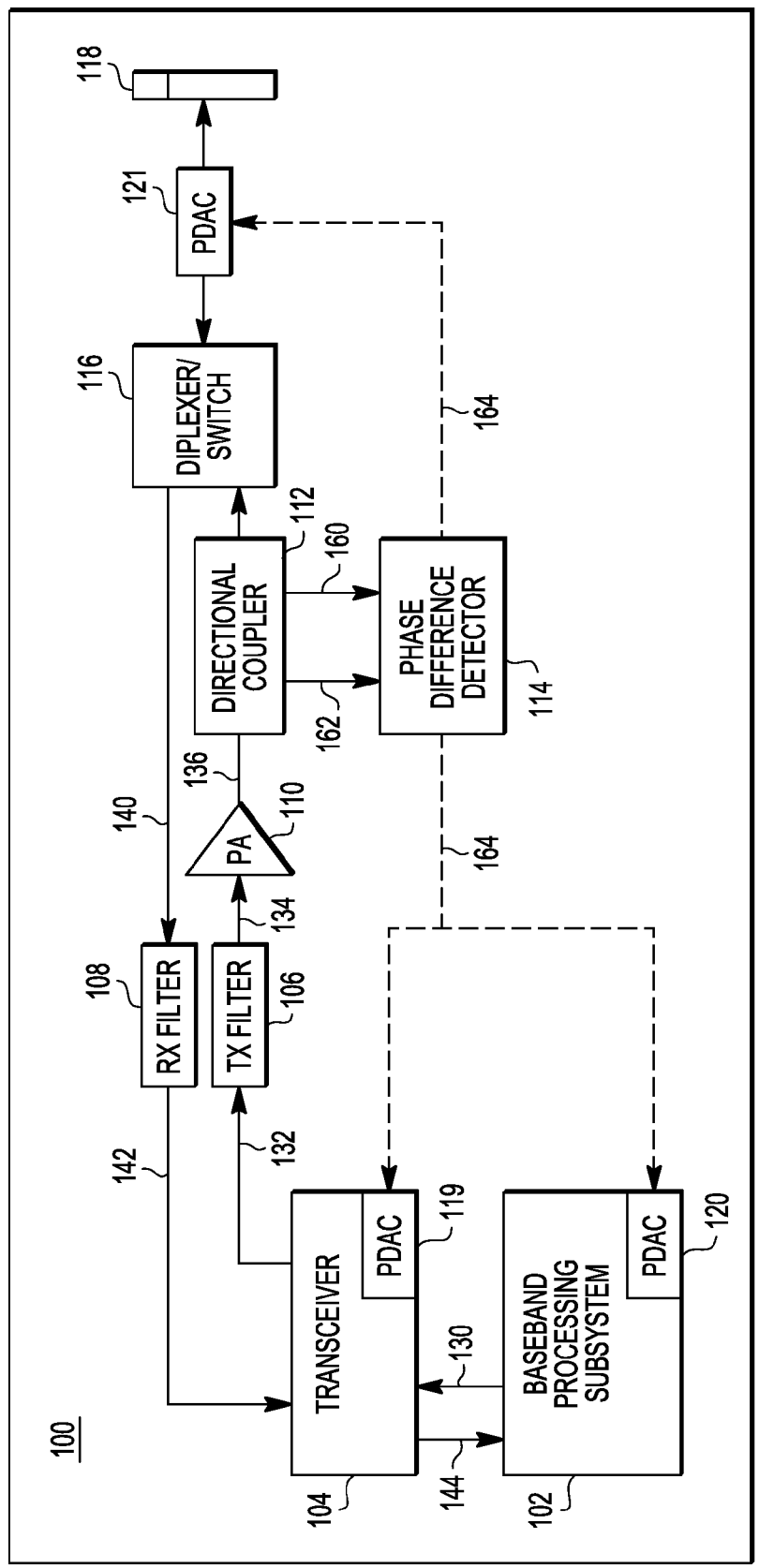
FIG. 1 illustrates a simplified block diagram of a wireless device having a phase difference detection apparatus, in accordance with an example embodiment.

FIG. 1 illustrates a simplified block diagram of a wireless device 100, in accordance with an example embodiment. Device 100 is adapted to transmit electromagnetic signals over an air interface. Wireless device 100 may be incorporated into a variety of different types of apparatus. For example, but not by way of limitation, wireless device 100 may be incorporated into a cellular telephone, a radio, a personal data assistant (PDA), a computer (e.g., a laptop, notebook, desktop or other type of computer), a mobile internet device (MID), and/or another device that is adapted to transmit electromagnetic signals over an air interface.

Wireless device 100 includes at least one baseband processing subsystem 102, transceiver 104, analog RF transmit (TX) filter 106, analog RF receive (RX) filter 108, power amplifier (PA) 110, directional coupler 112, phase difference detector 114, diplexer/switch 116, antenna 118, and phase difference adjustment circuitry (PDAC) 119, 120, 121, in an embodiment. These subsystems are operably coupled together as illustrated in FIG. 1, where the term "operably coupled" means that, during operation, signals, information, or other electric energy are transmissible through various interconnections between the subsystems. The interconnections between the subsystems may be direct interconnections that include conductive transmission media, or may be indirect interconnections that include one or more intermediate electrical components. Although certain interconnections are illustrated in FIG. 1, it is to be understood that more, fewer or different interconnections may be present in other embodiments. In addition, it is to be understood that a wireless device may have different configurations from that illustrated in FIG. 1, in other embodiments, while still implementing embodiments of the inventive subject matter.

The baseband processing subsystem 102 is adapted to perform various functions. These functions may include, for example, interfacing with at least one memory subsystem (not illustrated) to store and retrieve data, interfacing with at least one user interface subsystem (not illustrated) to receive or provide information and signals, and performing various power control functions in conjunction with the at least one power supply subsystem (not illustrated). In addition, baseband processing subsystem 102 is adapted to generate baseband, digital transmit signal 130 and to process baseband, digital receive signal 144. Generating digital transmit signal 130 may include, for example, packetizing data (e.g., symbols modulated using QAM (Quadrature Amplitude Modulation)) in compliance with a pre-defined protocol and performing error correction, among other things. According to an embodiment, digital transmit signal 130 includes a stream of complex, digital baseband samples, where real (I) components of the samples are provided in parallel with imaginary (Q) components of the samples. Alternative embodiments may utilize an amplitude and phase representation for the digital transmit signal 130 in place of real and imaginary components to effect the modulation, without otherwise affecting the operation of the below-described embodiments. Similarly, digital receive signal 144 includes a stream of complex digital baseband samples represented by parallel streams of real and imaginary sample components. Processing the digital receive signal 144 may include, for example, parsing, demodulating, and processing data represented in the digital receive signal 144 in accordance with the pre-defined protocol with which the digital receive signal 144 was produced.

Transceiver 104 includes a transmitter lineup and a receiver lineup. In simplified terms, the transmitter lineup is adapted to receive the digital transmit signal 130 from baseband processing subsystem 102, to process and convert the digital transmit signal 130 into an analog signal, and to up-convert the analog signal to an RF frequency, in order to produce an analog RF transmit signal 132. The analog RF transmit signal 132 is filtered by RF transmit (TX) filter 106 (e.g., an analog implementation of a finite impulse response (FIR) filter, such as a surface acoustic wave (SAW) filter), and the resulting filtered transmit signal 134 is amplified by power amplifier 110. During a transmit interval, the amplified RF transmit signal 136 is provided by diplexer/switch 116 to antenna 118, which radiates the signal onto the air interface.

RF signals transmitted by the device's antenna 118 may be received by infrastructure (e.g., a base station or "Node B", not illustrated) associated with a wireless communication system. Antenna 118 also may receive RF signals present on the air interface, and during a receive interval, the RF receive signal 140 may be provided by diplexer/switch 116 to RF receive (RX) filter 108 (e.g., a SAW filter). RX filter 108 filters the RF receive signal 140, and provides the resulting filtered, RF receive signal 142 to the receiver lineup of transceiver 104. The receiver lineup of transceiver 104 is adapted to down-convert and demodulate the RF receive signal 142, among other things, and to convert the resulting baseband, analog, receive signal into the baseband, digital receive signal 144. The baseband, digital receive signal 144 is then processed by baseband processing subsystem 102.

Referring again to antenna 118 and power amplifier 110, an impedance mismatch may exist between the power amplifier 110 and the antenna 118, under certain circumstances. The impedance mismatch may be significant, for example, when antenna 118 is in close physical proximity to certain objects (e.g., metallic objects). The impedance mismatch causes RF power to be reflected from the input of antenna 118 back into the power amplifier 110.

According to an embodiment, directional coupler 112 is adapted to couple out part of the power in the transmission line between the power amplifier 110 and diplexer 116 (or antenna 118). More particularly, directional coupler 112 is adapted to couple out an incident signal representation 160 on one port, and a reflected signal representation 162 on another port. The incident signal representation 160 is an attenuated representation of the signal produced by power amplifier 110 (i.e., the signal to be transmitted), and the reflected signal representation 162 is an attenuated representation of a reflected version of the signal to be transmitted (i.e., a portion of the incident signal that is reflected back by the antenna 118 due to an impedance mismatch between the antenna 118 and the power amplifier 110).

As will be described in more detail in conjunction with FIGS. 2-5, phase difference detector 114 is adapted to receive the incident and reflected signal representations 160, 162, and to process those signals in order to detect a relative phase difference between the incident signal and the reflected signal. Phase difference detector 114 is also adapted to produce a digital signal 164 that indicates a region (e.g., an octant) of a reference circle within which the relative phase difference occurs. The digital signal 164 may be received by phase difference adjustment circuitry (PDAC) 119, 120, and/or 121 in baseband processor 102, transceiver 104, and/or at the input to antenna 118, according to various embodiments. When the value represented in the digital signal 164 indicates that the relative phase difference falls within particular regions of the reference circle (e.g., within regions associated with relatively poor performance, as will be described in more detail later), the phase difference adjustment circuitry 119-121 may adjust a phase of the reflected signal with respect to the incident signal so that the relative phase difference between the incident signal and the reflected signal occurs within one or more other regions of the reference circle (e.g., within a region associated with improved performance, as will be described in more detail later). This may have the effect of compensating for impedance mismatches between power amplifier 110 and antenna 118 without significantly affecting the power amplifier's linearity, RF output power, and/or efficiency.

Figure 2:
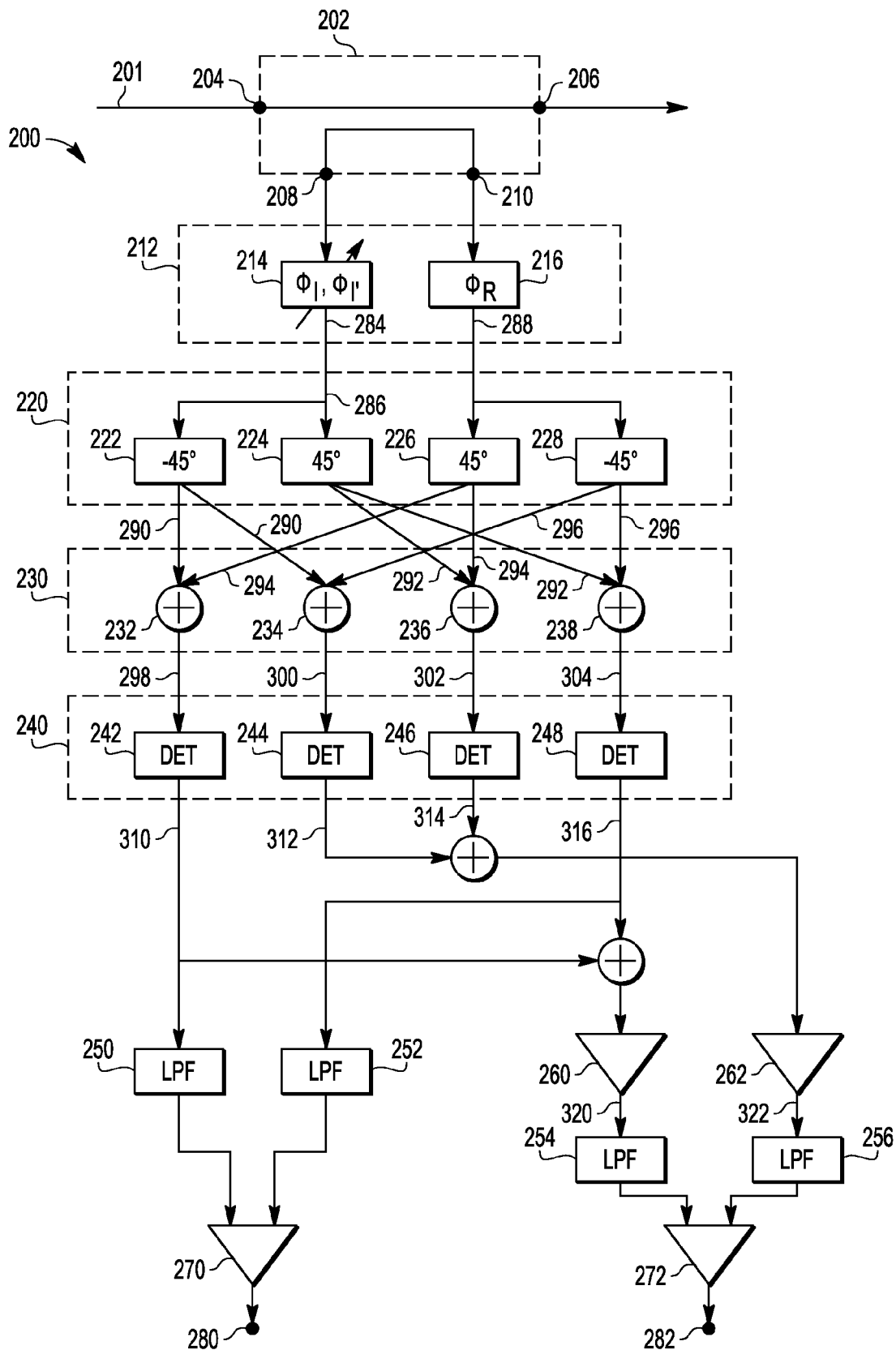
FIG. 2 illustrates a simplified block diagram of a phase difference detection apparatus, in accordance with an example embodiment.

Embodiments relate to phase difference detection apparatus. More particularly, FIG. 2 illustrates a simplified block diagram of a phase difference detection apparatus 200, in accordance with an example embodiment. Phase difference detection apparatus 200 is adapted to detect a relative phase difference between an incident signal and a reflected signal on a transmission line 201 between a power amplifier (e.g., power amplifier 110, FIG. 1) and an antenna (e.g., antenna 118, FIG. 1). According to an embodiment, phase difference detection apparatus 200 includes directional coupler 202, a plurality of phase shifters 212, 220, a plurality of combiners 230, a plurality of detectors 240, a plurality of gain application elements 260, 262, and a plurality of comparators 270, 272, among other elements, which will be described in more detail below. The above listed elements may be operatively coupled together as shown in FIG. 2, according to an embodiment, although variations to the components and the manner in which they are coupled are intended to be included within the scope of the embodiments.

Directional coupler 202 includes a first port 204, a second port 206, a third port 208, and a fourth port 210. Transmission line 201 is coupled through the first and second ports 204, 206 such that an incident signal (e.g., a signal from power amplifier 110, FIG. 1) is input to the first port 204 and is output from the second port 206. In contrast, a reflected signal (e.g., a signal from antenna 118, FIG. 1) is input into the second port 206 and is output from the first port 204. A representation of the incident signal, $S_I$, (e.g., an attenuated version of the incident signal) is coupled out the third port 208, and a representation of the reflected signal, $S_R$, (e.g., an attenuated version of the reflected signal) is coupled out the fourth port 210, according to an embodiment.

The incident signal representation and the reflected signal representations are received by the plurality of phase shifters 212, 220. Each of the plurality of phase shifters 212, 220 may include a lumped element RF circuit, according to an embodiment, and thus may consist primarily or exclusively of passive RF components. As will be described in more detail below, during a first measurement interval (e.g., at a first time) the plurality of phase shifters 212, 220 are adapted to apply 0 degree, ±45 degree, and 90 degree phase shifts to the incident and reflected signal representations, which enables a determination of the location of the relative phase difference between the incident and the reflected signals to be within one of four quadrants of a first reference circle (e.g., quadrants 1-4 of reference circle 440, FIG. 4). During a second measurement interval (e.g., at a second time), the plurality of phase shifters 212, 220 are adapted to apply only ±45 degree phase shifts to the incident and reflected signal representations, which enables a determination of the relative phase difference between the incident and the reflected signals to be within one of four quadrants of a second reference circle (e.g., quadrants 1-4 of reference circle 450, FIG. 4). A comparison of the results obtained during the first and second measurement intervals yield a determination of the location of the relative phase difference to be within one of eight octants of a third reference circle (e.g., octants 1-8 of reference circle 460, FIG. 4), as will be described in more detail later.

According to an embodiment, the plurality of phase shifters 212, 220 includes a first set of phase shifters and a second set of phase shifters. According to various embodiments, a "set" may include from one to four phase shifters, although a "set" also may include a null set, in some instances or may include more than four phase shifters. The first set of phase shifters (i.e., phase shifters 212) includes a first phase shifter 214 and a second phase shifter 216. The first phase shifter 214 is adapted to apply a first phase shift, $\Phi_I$, to the incident signal representation during a first measurement interval, in order to produce a first intermediate phase shifted signal 284. The first intermediate phase shifted signal 284 may be represented, for example, as $S_{284}=S_I\times\Phi_I$, where $S_{284}$ represents the signal at reference number 284. According to an embodiment, the first phase shifter 214 is a variable phase shifter, which may be adjusted to apply a second phase shift, $\Phi_{I'}$, to the incident signal representation during a second measurement interval, in order to produce a second intermediate phase shifted signal 286. The second intermediate phase shifted signal 286 may be represented, for example, as $S_{286}=S_I\times\Phi_{I'}$, where $S_{286}$ represents the signal at reference number 286. The second phase shifter 216 is adapted to apply a third phase shift, $\Phi_R$, to the reflected signal representation, in order to produce a third intermediate phase shifted signal 288. The third intermediate phase shifted signal 288 may be represented, for example, as $S_{288}=S_R\times\Phi_R$, where $S_{288}$ represents the signal at reference number 288.

According to an example embodiment, the third phase shift, $\Phi_R$, is substantially 45 degrees out of phase with the first phase shift, $\Phi_I$, and the third phase shift, $\Phi_R$, is substantially equal to the second phase shift, $\Phi_{I'}$. According to a more particular example embodiment, which will be discussed through the remainder of this description, the first phase shift, $\Phi_I$, is approximately 45 degrees, the second phase shift, $\Phi_{I'}$, is approximately 0 degrees, and the third phase shift, $\Phi_R$, is approximately 0 degrees. Accordingly: $S_{284}=S_I\times\Phi(45°)$; $S_{286}=S_I$; and $S_{288}=S_R$. It is to be understood that, in other embodiments, other phase shifts may be applied by the first and second phase shifters 214, 216, while achieving substantially the same result as the example embodiment described herein. In addition, it is to be understood that a phase shifter that is adapted to apply a phase shift of 0 degrees may be replaced, in other embodiments, with a component that may merely adjust the gain of the incident or reflected signal representations by an amount that corresponds to a phase shifter. In still other embodiments, a phase shifter that is adapted to apply a phase shift of 0 degrees may be eliminated completely, without replacement.

The second set of phase shifters (i.e., phase shifters 220) includes a third phase shifter 222, a fourth phase shifter 224, a fifth phase shifter 226, and a sixth phase shifter 228, according to an embodiment. The third phase shifter 222 is adapted to apply a fourth phase shift to the first intermediate phase shifted signal 284 during the first measurement interval, in order to produce a first-interval phase shifted signal 290. According to an embodiment, the fourth phase shift is about −45 degrees out of phase with the third phase shift, $\Phi_R$ (e.g., the fourth phase shift is approximately −45 degrees). The third phase shifter 222 also is adapted to apply the fourth phase shift to the second intermediate phase shifted signal 286 during the second measurement interval, in order to produce a second-interval phase shifted signal 290.

The fourth phase shifter 224 is adapted to apply a fifth phase shift to the first intermediate phase shifted signal 284 during the first measurement interval, in order to produce a another first-interval phase shifted signal 292. According to an embodiment, the fifth phase shift is about +45 degrees out of phase with the third phase shift, $\Phi_R$ (e.g., the fifth phase shift is approximately +45 degrees). The fourth phase shifter 224 also is adapted to apply the fifth phase shift to the second intermediate phase shifted signal 286 during the second measurement interval, in order to produce another second-interval phase shifted signal 292.

The fifth phase shifter 226 is adapted to apply a sixth phase shift to the third intermediate phase shifted signal 288, in order to produce another phase shifted signal 294 during both the first measurement interval and the second measurement interval. According to an embodiment, the sixth phase shift is about +45 degrees out of phase with the third phase shift, $\Phi_R$ (e.g., the sixth phase shift is approximately +45 degrees). Finally, the sixth phase shifter 228 is adapted to apply a seventh phase shift to the third intermediate phase shifted signal 288, in order to produce yet another first-interval phase shifted signal 296 during both the first measurement interval and the second measurement interval. According to an embodiment, the seventh phase shift is about −45 degrees out of phase with the third phase shift, $\Phi_R$ (e.g., the seventh phase shift is approximately −45 degrees).

According to the above example embodiment, the first, second, third, and fourth phase shifters 222, 224, 226, 228 produce the following signals:

$S_{290}=S_I$ (first measurement interval) or $S_{290}=S_I\times\Phi(-45°)$ (second measurement interval);

$S_{292}=S_I\times\Phi(90°)$ (first measurement interval) or $S_{292}=S_I\times\Phi(45°)$ (second measurement interval);

$S_{294}=S_R\times\Phi(45°)$ (first and second measurement intervals); and $S_{296}=S_R\times\Phi(-45°)$ (first and second measurement intervals), where $S_{290}$, $S_{292}$, $S_{294}$, and $S_{296}$ represent the signals at reference numbers 290, 292, 294, and 296, respectively.

The first-interval and second-interval phase shifted signals 290, 292, 294, 296 are provided to the plurality of combiners 230, during the first measurement interval and the second measurement interval, respectively. The plurality of combiners 230 are adapted to combine different pairs of the first-interval and second-interval phase shifted signals 290, 292, 294, 296, in order to produce a plurality of first-interval combined signals 298, 300, 302, 304 (during the first measurement interval) and a plurality of second-interval combined signals 298, 300, 302, 304 (during the second measurement interval).

According to an embodiment, the plurality of combiners includes a first combiner 232, a second combiner 234, a third combiner 236, and a fourth combiner 238. The first combiner 232 is adapted to combine, during the first measurement interval, a first pair of the first-interval phase shifted signals, in order to produce a first, first-interval combined signal 298. According to an embodiment, the combined signals include the first and third, first-interval phase shifted signals 290, 294. In addition, the first combiner 232 is adapted to combine, during the second measurement interval, the first pair of the second-interval phase shifted signals (e.g., signals 290, 294), in order to produce a first, second-interval combined signal 298.

The second combiner 234 is adapted to combine, during the first measurement interval, a second pair of the first-interval phase shifted signals, in order to produce a second, first-interval phase shifted signal 300. According to an embodiment, the combined signals include the first and fourth, first-interval phase shifted signals 290, 296. In addition, the second combiner 234 is adapted to combine, during the second measurement interval, the second pair of the second-interval phase shifted signals (e.g., signals 290, 296), in order to produce a second, second-interval combined signal 300.

The third combiner 236 is adapted to combine, during the first measurement interval, a third pair of the first-interval phase shifted signals, in order to produce a third, first-interval phase shifted signal 302. According to an embodiment, the combined signals include the second and third, first-interval phase shifted signals 292, 294. In addition, the third combiner 236 is adapted to combine, during the second measurement interval, the third pair of the second-interval phase shifted signals (e.g., signals 292, 294), in order to produce a third, second-interval combined signal 302.

Finally, the fourth combiner 238 is adapted to combine, during the first measurement interval, a fourth pair of the first-interval phase shifted signals, in order to produce a fourth, first-interval phase shifted signal 304. According to an embodiment, the combined signals include the second and fourth, first-interval phase shifted signals 292, 296. In addition, the fourth combiner 238 is adapted to combine, during the second measurement interval, the fourth pair of the second-interval phase shifted signals (e.g., signals 292, 296), in order to produce a fourth, second-interval combined signal 304.

According to the above example embodiment, the first, second, third, and fourth combiners 232, 234, 236, 238 produce the following signals:

$S_{298}=S_I+S_R \times \Phi(45°)$ (first measurement interval) or $S_{298}=S_I+S_R \times \Phi(90°)$ (second measurement interval);

$S_{300}=S_I+S_R \times \Phi(-45°)$ (first measurement interval) or $S_{300}=S_I+S_R$ (second measurement interval);

$S_{302}=S_I \times \Phi(90°)+S_R \times \Phi(45°)=S_I+S_R \times \Phi(-45°)$ (first measurement interval) or $S_{302}=S_I \times \Phi(45°)+S_R \times \Phi(45°)=S_I+S_R$ (second measurement interval); and $S_{304}=S_I \times \Phi(90°)+S_R \times \Phi(-45°)=S_I+S_R \times \Phi(-135°)$ (first measurement interval) or $S_{304}=S_I \times \Phi(45°)+S_R \times \Phi(-45°)=S_I+S_R \times \Phi(-90°)$ (second measurement interval), where $S_{298}$, $S_{300}$, $S_{302}$, and $S_{304}$ represent the signals at reference numbers 298, 300, 302, and 304, respectively.

The plurality of first-interval combined signals 298, 300, 302, 304 and the plurality of second-interval combined signals 298, 300, 302, 304 are provided to the plurality of detectors 240, during the first measurement interval and the second measurement interval, respectively. The plurality of detectors 240 are adapted to detect amplitudes of the first-interval combined signals 298, 300, 302, 304, during the first measurement interval, in order to produce a plurality of first-interval amplitude signals 310, 312, 314, 316. In addition, the plurality of detectors 240 are adapted to detect amplitudes of the second-interval combined signals 298, 300, 302, 304, during the second measurement interval, in order to produce a plurality of second-interval amplitude signals 310, 312, 314, 316.

According to an embodiment, the plurality of detectors 240 includes a first detector 242, a second detector 244, a third detector 246, and a fourth detector 248. The first detector 242 is adapted to detect an amplitude of first-interval combined signal 298, during the first measurement interval, in order to produce a first-interval amplitude signal 310. In addition, the first detector 242 is adapted to detect an amplitude of second-interval combined signal 298, during the second measurement interval, in order to produce a second-interval amplitude signal 310. The second detector 244 is adapted to detect an amplitude of first-interval combined signal 300, during the first measurement interval, in order to produce a first-interval amplitude signal 312. In addition, the second detector 244 is adapted to detect an amplitude of second-interval combined signal 300, during the second measurement interval, in order to produce a second-interval amplitude signal 312. The third detector 246 is adapted to detect an amplitude of first-interval combined signal 302, during the first measurement interval, in order to produce a first-interval amplitude signal 314. In addition, the third detector 246 is adapted to detect an amplitude of second-interval combined signal 302, during the second measurement interval, in order to produce a second-interval amplitude signal 314. Finally, the fourth detector 248 is adapted to detect an amplitude of first-interval combined signal 304, during the first measurement interval, in order to produce a first-interval amplitude signal 316. In addition, the fourth detector 248 is adapted to detect an amplitude of second-interval combined signal 304, during the second measurement interval, in order to produce a second-interval amplitude signal 316.

Figure 3:
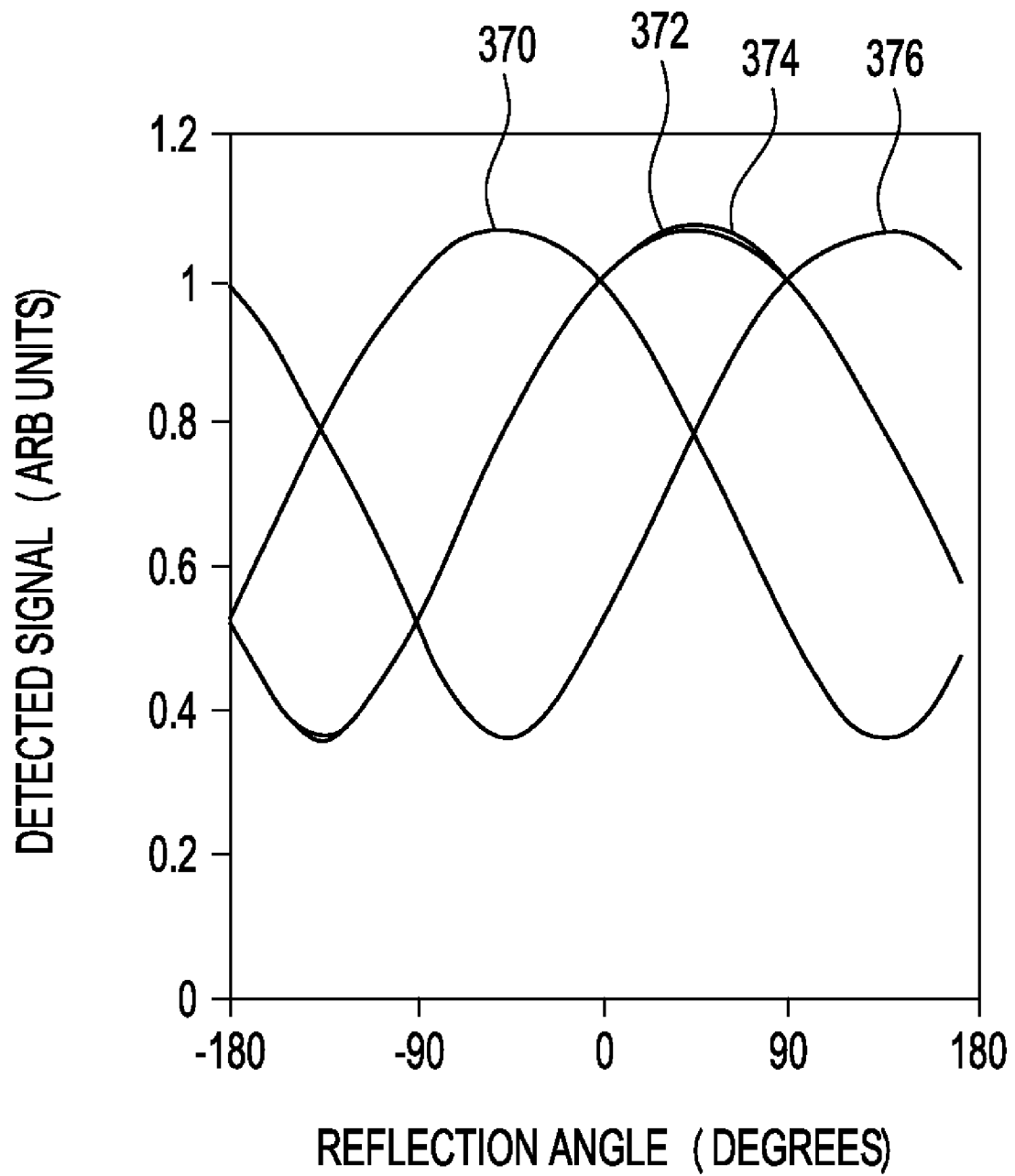
FIG. 3 illustrates a chart showing the relative amplitudes of signals output from a plurality of detectors, according to an example embodiment.

According to the above example embodiment, the first, second, third, and fourth detectors 242, 244, 246, 248 produce the following signals:

$S_{310}=|S_I+S_R \times \Phi(45°)|$ (first measurement interval) or $S_{310}=|S_I+S_R \times \Phi(90°)|$ (second measurement interval);

$S_{312}=|S_I+S_R \times \Phi(-45°)|$ (first measurement interval) or $S_{312}=|S_I+S_R|$ (second measurement interval);

$S_{314}=|S_I \times \Phi(90°)+S_R \times \Phi(45°)|=|S_I+S_R \times \Phi(-45°)|$ (first measurement interval) or $S_{314}=|S_I \times \Phi(45°)+S_R \times \Phi(45°)|=|S_I+S_R|$ (second measurement interval); and $S_{316}=|S_I \times \Phi(90°)+S_R \times \Phi(-45°)|=|S_I+S_R \times \Phi(-135°)|$ (first measurement interval) or $S_{316}=|S_I \times \Phi(45°)+S_R \times \Phi(-45°)|=|S_I+S_R \times \Phi(-90°)|$ (second measurement interval), where $S_{310}$, $S_{312}$, $S_{314}$, and $S_{316}$ represent the signals at reference numbers 310, 312, 314, and 316, respectively. FIG. 3 illustrates a chart 300 showing the relative amplitudes of signals $S_{310}$, $S_{312}$, $S_{314}$, and $S_{316}$ output from the plurality of detectors 240 during the first measurement interval, according to an example embodiment, and under the condition of varying phase of the reflected signal $S_R$ in relation to the incident signal $S_I$. In particular, trace 370 corresponds to $S_{310}$, trace 372 corresponds to $S_{312}$, trace 374 corresponds to $S_{314}$, and trace 376 corresponds to trace $S_{316}$. As FIG. 3 illustrates, $S_{312}$ 372 and $S_{314}$ 374 are substantially aligned. Accordingly, in an alternate embodiment, combiner 234 and detector 244 may be eliminated from the system, or combiner 236 and detector 246 may be eliminated from the system, and the output signal from the remaining detector (244 or 246) may be provided to gain application element 262, as described below.

Referring again to FIG. 2, the plurality of first-interval amplitude signals 310, 312, 314, 316 and the plurality of second-interval amplitude signals 310, 312, 314, 316 are provided, ultimately, to a plurality of comparators 270, 272 during the first measurement interval and the second measurement interval, respectively. Prior to being provided to the comparators 270, 272, the signals 310, 312, 314, 316 may be further processed, according to an embodiment. For example, each of first-interval amplitude signals 310, 316 or each of second-interval amplitude signals 310, 316 may be processed by a low pass filter 250, 252 (LPF), in order to filter out high frequency components, prior to being provided to comparator 270. Comparator 270 receives each of the filtered first-interval amplitude signals 310, 316 (during the first measurement interval) or each of the filtered second-interval amplitude signals 310, 316 (during the second measurement interval), and combines the signals 310, 316 together, to generate a first-interval digital signal at node 280 (during the first measurement interval) or a second-interval digital signal at node 280 (during the second measurement interval). More particularly, comparator 270 determines the difference between signals 310, 316 (e.g., comparator 270 determines $S_{310}$-$S_{316}$). According to an embodiment, digital signal at node 280 will have a relatively high voltage (e.g., a logical "1" value) when signal 310 is greater than signal 316 (e.g., $S_{310}$-$S_{316}$>0), and digital signal at node 280 will have a relatively low voltage (e.g., a logical "0" value) when signal 316 is greater than signal 310 (e.g., $S_{310}$-$S_{316}$<0). Accordingly:

$S_{280}$=1 when $S_{310}$>$S_{316}$; and $S_{280}$=0 when $S_{310}$<$S_{316}$, where $S_{280}$ represents the signal at node 280.

According to an embodiment, the second comparator 272 receives differently gain-adjusted combinations of signals 310, 312, 314, 316. For example, a first gain application element 260 is adapted to receive a combination of first-interval amplitude signals 310, 316 (during the first measurement interval) or a combination of second-interval amplitude signals 310, 316 (during the second measurement interval), and to apply a first gain, $G_1$, to the combined signals 310, 316. Accordingly, the first gain application element 260 produces the following signal:

$S_{320}$=$G_1$(|$S_I$+$S_R$×Φ(45°)|+|$S_I$+$S_R$×Φ(−135°)|) (first measurement interval), or $S_{320}$=$G_1$(|$S_I$+$S_R$×Φ(90°)|+|$S_I$+$S_R$×Φ(−90°)|) (second measurement interval), where $S_{320}$ represents the signal at reference number 320.

A second gain application element 262 is adapted to receive a combination of first-interval amplitude signals 312, 314 (during the first measurement interval) or a combination of second-interval amplitude signals 312, 314 (during the second measurement interval), and to apply a second gain, $G_2$, to the combined signals 312, 314. Accordingly, the second gain application element 262 produces the following signal:

$S_{322}$=$G_2$(|$S_I$+$S_R$×Φ(−45°)|+|$S_I$+$S_R$×Φ(−45°)|) (first measurement interval), or $S_{322}$=$G_2$(|$S_I$+$S_R$|+|$S_I$+$S_R$|) (second measurement interval), where $S_{322}$ represents the signal at reference number 322. According to an embodiment, the first gain, $G_1$, and the second gain, $G_2$, are unequal (e.g., about 5% to 20% different from each other). For example, the first gain, $G_1$, may have a value in a range of about 0.50 to about 0.60, and the second gain, $G_2$, may have a value in a range of about 0.45 to about 0.55. As a more specific example, the first gain, $G_1$, may have a value of about 0.56 (or about 1/1.8) and the second gain, $G_2$, may have a value of about 0.50 (or about ½).

Prior to being provided to the comparator 272, the first-interval gain adjusted combination signals 320, 322 and the second-interval gain adjusted combination signals 320, 322 may be further processed, according to an embodiment. For example, each of first-interval gain adjusted combination signals 320, 322 or each of second-interval gain adjusted combination signals 320, 322 may be processed by a low pass filter 254, 256 (LPF), in order to filter out high frequency components, prior to being provided to comparator 272. Comparator 272 receives each of the filtered first-interval gain adjusted combination signals 320, 322 (during the first measurement interval) or each of the filtered second-interval gain adjusted combination signals 320, 322 (during the second measurement interval), and combines the signals 320, 322 together, to generate a first-interval digital signal at node 282 (during the first measurement interval) or a second-interval digital signal at node 282 (during the second measurement interval). More particularly, comparator 272 determines the difference between signals 320, 322 (e.g., comparator 272 determines $S_{320}$-$S_{322}$). According to an embodiment, digital signal at node 282 will have a relatively high voltage (e.g., a logical "1" value) when signal 320 is greater than signal 322 (e.g., $S_{320}$-$S_{322}$>0), and digital signal at node 282 will have a relatively low voltage (e.g., a logical "0" value) when signal 322 is greater than signal 320 (e.g., $S_{320}$-$S_{322}$<0). Accordingly:

$S_{282}$=1 when $S_{320}$>$S_{322}$; and $S_{282}$=0 when $S_{320}$<$S_{322}$, where $S_{282}$ represents the signal at node 282.

Figure 4:
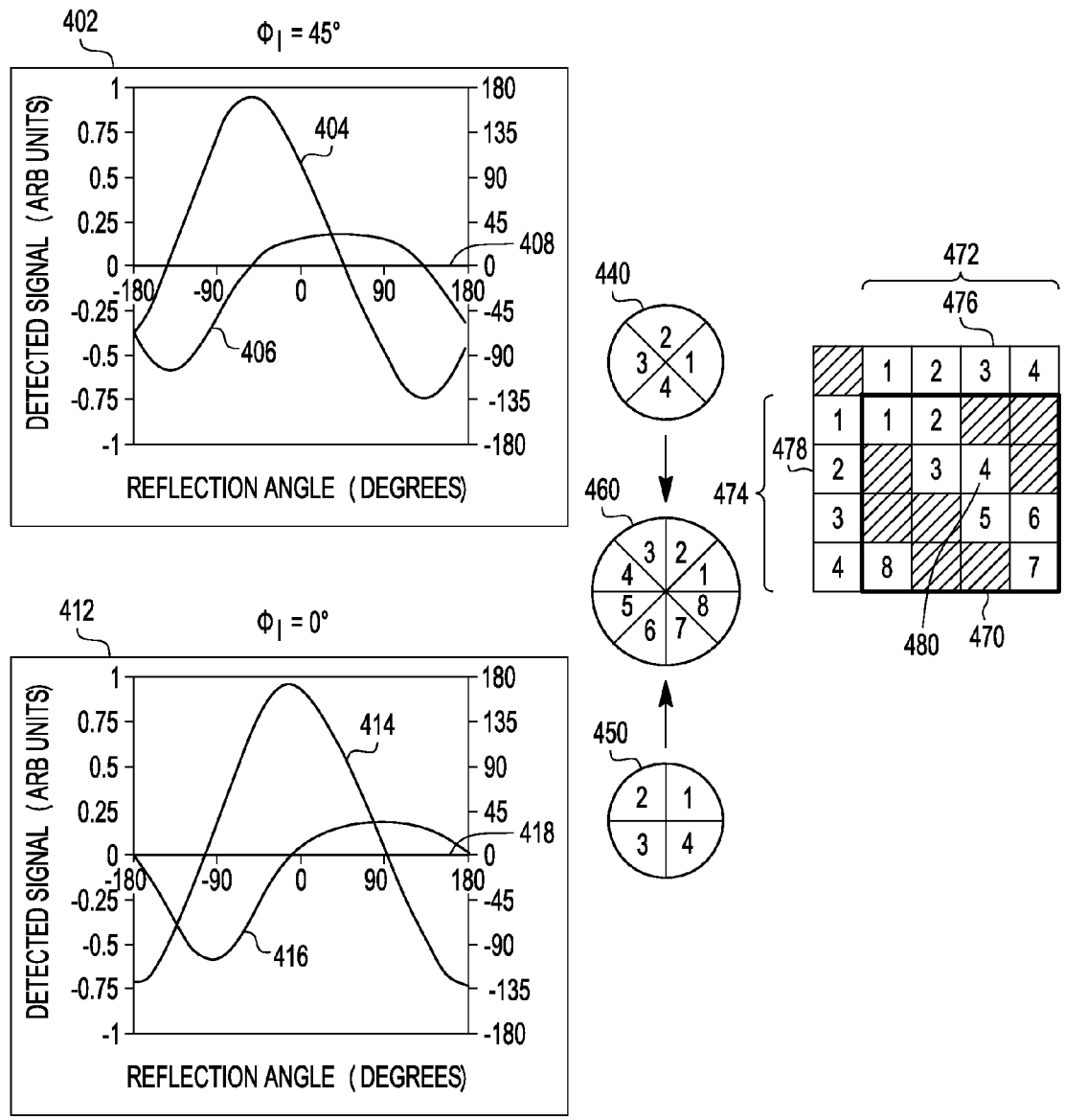
FIG. 4 includes graphs illustrating signals processed by combiners, within the system, for different applied phase shifts, and logic for determining an octant of a reference circle within which a relative phase difference occurs, in accordance with an example embodiment.

According to an embodiment, the digital signals at nodes 280, 282 during the first and second measurement intervals indicate a region of a reference circle within which the relative phase difference between the incident signal and the reflected signal occurs (e.g., the incident and reflected signals carried on transmission line 201). Reference to FIG. 4 will clarify this concept.

FIG. 4 are graphs 402, 412 illustrating signals processed by comparators 270, 272 (FIG. 2) for different applied phase shifts (e.g., during a first and a second measurement interval), and logic for determining an octant of a reference circle 460 within which the relative phase difference occurs, in accordance with an example embodiment. More particularly, graph 402 indicates the signal strength (vertical axis) of signal combinations produced by comparators 270, 272 versus reflection angle (horizontal axis) for a first phase angle applied to the incident signal representation (e.g., for $Φ_I$=45°) (e.g., during a first measurement interval). Trace 404 corresponds to the amplitudes of the differences between signals 310, 316 (FIG. 3) (e.g., $S_{310}$-$S_{316}$, as determined by comparator 270, FIG. 2). In contrast, trace 406 corresponds to the amplitudes of the differences between signals 320, 322 (FIG. 3) (e.g., $S_{320}$-$S_{322}$, as determined by comparator 272). When trace 404 is above the zero axis 408 (e.g., when $S_{310}$>$S_{316}$), then comparator combiner 270 outputs a logical "1" value, and when trace 404 is below the zero axis 408 (e.g., when $S_{310}$<$S_{316}$), then comparator 270 outputs a logical "0" value. Similarly, when trace 406 is above the zero axis 408 (e.g., when $S_{320}$>$S_{322}$), then comparator 272 outputs a logical "1" value, and when trace 406 is below the zero axis 408 (e.g., when $S_{320}$<$S_{322}$), then comparator 272 outputs a logical "0" value. Each of the four possible digital combinations of outputs from comparators 270, 272 (i.e., "00", "01", "10", and "11") indicates a quadrant of reference circle 440, within which the relative phase difference between the incident signal and the reflected signal occurs. For example, a combined value of "00" may correspond to quadrant 1, a combined value of "01" may correspond to quadrant 2, a combined value of "10" may correspond to quadrant 3, and a combined value of "11" may correspond to quadrant 4. Reference circle 440 is rotated by the value of $Φ_I$ (e.g., rotated by 45°), as shown in FIG. 4.

Graph 412 indicates the signal strength (vertical axis) of signal combinations produced by comparators 270, 272 versus reflection angle (horizontal axis) for a second phase angle applied to the incident signal representation (e.g., for $Φ_I$=0°) (e.g., during a second measurement interval). Trace 414 corresponds to the amplitudes of the differences between signals 310, 316 (FIG. 3) (e.g., $S_{310}$-$S_{316}$, as determined by comparator 270, FIG. 2). In contrast, trace 416 corresponds to the amplitudes of the differences between signals 320, 322 (FIG. 3) (e.g., $S_{320}$-$S_{322}$, as determined by comparator 272). When trace 414 is above the zero axis 418 (e.g., when $S_{310}$>$S_{316}$), then comparator 270 outputs a logical "1" value, and when trace 414 is below the zero axis 418 (e.g., when $S_{310}$<$S_{316}$), then comparator 270 outputs a logical "0" value. Similarly, when trace 416 is above the zero axis 418 (e.g., when $S_{320}$>$S_{322}$), then comparator 272 outputs a logical "1" value, and when trace 416 is below the zero axis 408 (e.g., when $S_{320}$<$S_{322}$), then comparator 272 outputs a logical "0" value.

Each of the four possible digital combinations of outputs from comparators 270, 272 (i.e., "00", "01", "10", and "11") indicates a quadrant of reference circle 450, within which the relative phase difference between the incident signal and the reflected signal occurs. For example, a combined value of "00" may correspond to quadrant 1, a combined value of "01" may correspond to quadrant 2, a combined value of "10" may correspond to quadrant 3, and a combined value of "11" may correspond to quadrant 4. In contrast to reference circle 440, reference circle 450 is not rotated (or rotated by 0°), as shown in FIG. 4.

Upon detecting which quadrants of reference circles 440, 450 the relative phase difference occurs within (e.g., as indicated by the digital values produced by comparators 270, 272), a determination may be made of which octant of reference circle 460 the relative phase difference occurs within. Table 470 cross-references quadrants of reference circle 440 (indicated by quadrant numbers 472) and quadrants of reference circle 450 (indicated by quadrant numbers 474). The values within table 470 indicate which octant of reference circle 460 a relative phase difference occurs within for various combinations of quadrant determinations within reference circles 440, 450. For example, when the digital values produced by comparators 270, 272 during a first measurement interval indicate quadrant 3 of reference circle 440 (indicated by reference number 476), and when the digital values produced by comparators 270, 272 during a second measurement interval indicate quadrant 2 of reference circle 450 (indicated by reference number 478), then table 470 indicates that the octant of reference circle 460 within which the relative phase difference occurs is octant 4 (indicated by reference number 480).

It has been experimentally determined that system performance is degraded when the phase difference between the incident and reflected signals occurs within certain octants, when compared with other octants. For example, system performance may be more degraded in certain octants of reference circle 460 than in other octants. When the phase difference occurs within certain octants, system performance may be degraded significantly due to the impedance mismatch (e.g., the power amplifier's linearity, RF output power, and/or efficiency may be adversely affected). In contrast, when the phase difference occurs within other octants, system performance may not be degraded significantly due to the impedance mismatch. According to an embodiment, when a determination is made that the relative phase difference occurs within a "less desirable" octant (e.g., an octant associated with relatively poor performance), the system may perform corrections to the incident signal (e.g., by phase difference adjustment circuitry 119, 120, 121, FIG. 1), in order to move the relative phase difference into a "more desirable" octant (e.g., an octant associated with improved performance). Accordingly, system performance may be improved.

Figure 5:
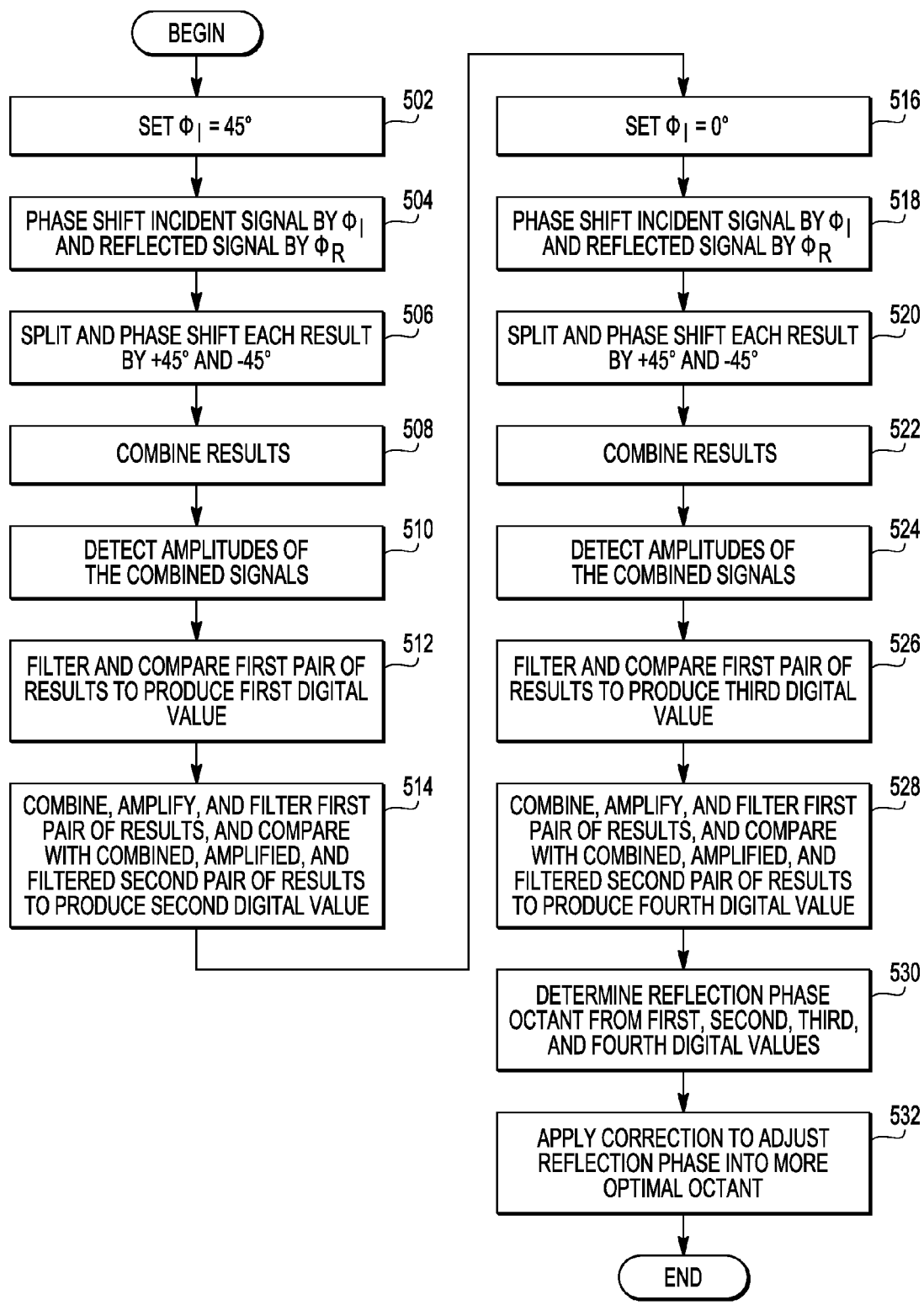
FIG. 5 is a flowchart of a method for detecting a relative phase difference between an incident signal and a reflected signal, in accordance with an example embodiment.

FIG. 5 is a flowchart of a method for detecting a relative phase difference between an incident signal and a reflected signal, in accordance with an example embodiment. The method may be performed by phase difference detection apparatus (e.g., phase difference detection apparatus 200, FIG. 2) in a wireless device (e.g., wireless device 100, FIG. 1), for example. Blocks 502-514 indicate process steps that may occur during a first measurement interval, and blocks 516-528 indicate process steps that may occur during a second measurement interval, according to an embodiment. It is to be understood that the second measurement interval may occur before the first measurement interval, in an alternate embodiment, and that the terms "first" and "second" are used arbitrarily, and not for the purpose of limitation.

With reference also to FIG. 2, the method begins, in block 502, by setting a variable phase shift, $\Phi_T$, to a first phase shift value (e.g., $\Phi_T=45°$). For example, the first phase shift value may indicate a phase shift that will be applied by phase shifter 214. In block 504, an incident signal representation is received and phase shifted (e.g., by phase shifter 214) by the first phase shift, $\Phi_T$, and a reflected signal representation is received and phase shifted (e.g., by phase shifter 216) by a second phase shift, $\Phi_R$ (e.g., 0°). In block 506, each result from block 504 (e.g., signals 284, 288) is split, and additional phase shifts (e.g., of +45° and −45°) are applied to the signals (e.g., by phase shifters 222, 224, 226, 228), in order to produce a plurality of first-interval phase shifted signals (e.g., signals 290, 292, 294, 296). Different pairs of the first-interval phase shifted signals are then combined (e.g., by combiners 232, 234, 236, 238), as described previously, in order to produce a plurality of first-interval combined signals (e.g., signals 298, 300, 302, 304), in block 508.

In block 510, the amplitudes of the first-interval combined signals are then detected (e.g., by detectors 242, 244, 246, 248), in order to produce a plurality of first-interval amplitude signals (e.g., signals 310, 312, 314, 316). In block 512, a first pair of the first-interval amplitude signals (e.g., signals 310 and 316) may then be filtered (e.g., by LPFs 250, 252) and compared (e.g., by comparator 270), in order to produce a first digital value (e.g., at node 280). In block 514, which may be performed in parallel with or before block 512, pairs of the first-interval amplitude signals are combined and amplified (e.g., by gain application elements 260, 262), as described previously, in order to produce first-interval gain adjusted combination signals (e.g., signals 320, 322). The first-interval gain adjusted combination signals may then be filtered (e.g., by LPFs 254, 256) and compared (e.g., by comparator 272), in order to produce a second digital value (e.g., at node 282). The first and second digital values may be retained (e.g., stored in temporary storage) for later evaluation (e.g., in block 530).

As mentioned above, blocks 516-528 indicate process steps that may occur during a second measurement interval, according to an embodiment. In block 516, the variable phase shift, $\Phi_T$, is set to a second phase shift value (e.g., $\Phi_T=0°$). For example, the second phase shift value may indicate a phase shift that will be applied by phase shifter 214. In block 518, an incident signal representation is received and phase shifted (e.g., by phase shifter 214) by the second phase shift, $\Phi_T$, and a reflected signal representation is received and phase shifted (e.g., by phase shifter 216) by a second phase shift, $\Phi_R$ (e.g., 0°). In block 520, each result from block 518 (e.g., signals 284, 288) is split, and additional phase shifts (e.g., of +45° and −45°) are applied to the signals (e.g., by phase shifters 222, 224, 226, 228), in order to produce a plurality of second-interval phase shifted signals (e.g., signals 290, 292, 294, 296). Different pairs of the second-interval phase shifted signals are then combined (e.g., by combiners 232, 234, 236, 238), as described previously, in order to produce a plurality of second-interval combined signals (e.g., signals 298, 300, 302, 304), in block 522.

In block 524, the amplitudes of the second-interval combined signals are then detected (e.g., by detectors 242, 244, 246, 248), in order to produce a plurality of second-interval amplitude signals (e.g., signals 310, 312, 314, 316). In block 526, a first pair of the second-interval amplitude signals (e.g., signals 310 and 316) may then be filtered (e.g., by LPFs 250, 252) and compared (e.g., by comparator 270), in order to produce a third digital value (e.g., at node 280). In block 528, which may be performed in parallel with or before block 526, pairs of the second-interval amplitude signals are combined and amplified (e.g., by gain application elements 260, 262), as described previously, in order to produce second-interval gain adjusted combination signals (e.g., signals 320, 322). The second-interval gain adjusted combination signals may then be filtered (e.g., by LPFs 254, 256) and compared (e.g., by comparator 272), in order to produce a fourth digital value (e.g., at node 282).

In block 530, the first, second, third, and fourth digital values may be evaluated in order to determine which octant of a reference circle (e.g., reference circle 460, FIG. 4) the relative phase difference between the incident signal and the reflected signal occurs within, as described previously in conjunction with the description of FIG. 4. Upon making that determination, in block 532, and when the relative phase is in a "less desirable" octant (e.g., an octant associated with relatively poor performance), corrections may be applied to the incident signal (e.g., by phase difference adjustment circuitry 119, 120, 121, FIG. 1), in order to move the relative phase difference into a "more desirable" octant (e.g., an octant associated with improved performance). In other words, based on the digital values, a phase of the reflected signal with respect to the incident signal may be adjusted so that the relative phase difference occurs within a region associated with improved performance. The method may then end.

It is to be understood that certain ones of the process blocks depicted in FIG. 5 may be performed in parallel with each other or with performing other processes. In addition, it is to be understood that the particular ordering of the process blocks depicted in FIG. 5 may be modified, while achieving substantially the same result. Accordingly, such modifications are intended to be included within the scope of the inventive subject matter.

Thus, various embodiments of phase difference detection methods and apparatus have been described. An embodiment includes an apparatus for detecting a relative phase difference between an incident signal and a reflected signal. The apparatus comprises a plurality of phase shifters, a plurality of combiners, and additional circuitry. The plurality of phase shifters is adapted to apply first phase shifts to a representation of the incident signal and to a representation of the reflected signal in order to produce a plurality of first phase shifted signals, and to apply second phase shifts to the representation of the incident signal and to the representation of the reflected signal in order to produce a plurality of second phase shifted signals. The plurality of combiners, which is operatively coupled to the plurality of phase shifters, is adapted to combine different pairs of the plurality of first phase shifted signals in order to produce a plurality of first combined signals, and to combine different pairs of the plurality of second phase shifted signals in order to produce a plurality of second combined signals. The additional circuitry, which is operatively coupled to the plurality of combiners, is adapted to detect amplitudes of the plurality of first combined signals in order to produce a plurality of first amplitude signals, to detect amplitudes of the plurality of second combined signals in order to produce a plurality of second amplitude signals, and to compare the plurality of first and second amplitude signals in order to produce a digital signal that indicates a region of a reference circle within which the relative phase difference occurs.

Another embodiment includes an apparatus for detecting a phase angle between an incident signal and a reflected signal. The apparatus comprises a plurality of phase shifters and additional circuitry. The plurality of phase shifters is adapted to apply first phase shifts to a representation of the incident signal and to apply second phase shifts to a representation of the reflected signal. The additional circuitry, which is operatively coupled to the plurality of phase shifters, is adapted to produce a first indication of a location of a relative phase difference between the incident signal and the reflected signal within a first region of a first reference circle, and to produce a second indication of the location of the relative phase difference within a second region of a second reference circle, wherein the second reference circle is rotated with respect to the first reference circle.

Yet another embodiment includes a method for detecting a relative phase difference between an incident signal and a reflected signal. The method includes the steps of applying first phase shifts to a representation of the incident signal and to a representation of the reflected signal in order to produce a plurality of first phase shifted signals, and applying second phase shifts to the representation of the incident signal and to the representation of the reflected signal in order to produce a plurality of second phase shifted signals. The method also includes combining different pairs of the plurality of first phase shifted signals in order to produce a plurality of first combined signals, combining different pairs of the plurality of second phase shifted signals in order to produce a plurality of second combined signals, detecting amplitudes of the plurality of first combined signals in order to produce a plurality of first amplitude signals, detecting amplitudes of the plurality of second combined signals in order to produce a plurality of second amplitude signals, and comparing the plurality of first and second amplitude signals in order to produce a digital signal that indicates a region of a reference circle within which the relative phase difference occurs.

Embodiments may include one or more additional or different processes and/or features. For example, although the above-described embodiments describe a system in which measurements are taken during a first measurement interval (e.g., when $\Phi_I=45°$) and subsequently taken during a second measurement interval (e.g., when $\Phi_I=0°$), alternate embodiments may instead duplicate portions of the architecture of FIG. 2 in order to take the various measurements simultaneously. For example, instead of having a single, switchable phase shifter 214 (FIG. 2), a system may include two phase shifters (e.g., one for applying a 45° phase shift, and one for applying a 0° phase shift), and the circuitry below phase shifter 214 could be essentially duplicated in order to produce four digital signals (e.g., digital signals at nodes 280, 282 and two additional nodes) as outputs to the system. In another alternate embodiment, the single, switchable phase shifter 214 (FIG. 2) may be replaced by two phase shifters (e.g., one for applying a 45° phase shift, and one for applying a 0° phase shift) and switching circuitry adapted to route the incident signal representation through the first phase shifter during a first measurement interval, and through the second phase shifter during a second measurement interval. In still other embodiments, a relative phase difference may be determined to be in a region that is different from an octant (e.g., a sixth of a reference circle, a sixteenth of a reference circle, or other sized regions), by varying the number of phase shifts applied and/or by varying the number of phase shifters. In other words, a reference circle may be divided into more or fewer regions than eight, in other embodiments. These and other variations are intended to be included within the scope of the inventive subject matter.

While the principles of the inventive subject matter have been described above in connection with specific systems, apparatus, and methods, it is to be clearly understood that this description is made only by way of example and not as a limitation on the scope of the inventive subject matter. The various functions or processing blocks discussed herein and illustrated in the Figures may be implemented in hardware, firmware, software or any combination thereof. Further, the phraseology or terminology employed herein is for the purpose of description and not of limitation.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. An apparatus for detecting a relative phase difference between an incident signal and a reflected signal, the apparatus comprising:
    a plurality of phase shifters adapted to apply first phase shifts to a representation of the incident signal and to a representation of the reflected signal in order to produce a plurality of first phase shifted signals, and to apply second phase shifts to the representation of the incident signal and to the representation of the reflected signal in order to produce a plurality of second phase shifted signals;
    a plurality of combiners, operatively coupled to the plurality of phase shifters, and adapted to combine different pairs of the plurality of first phase shifted signals in order to produce a plurality of first combined signals, and to combine different pairs of the plurality of second phase shifted signals in order to produce a plurality of second combined signals; and
    additional circuitry, operatively coupled to the plurality of combiners, and adapted to detect amplitudes of the plurality of first combined signals in order to produce a plurality of first amplitude signals, to detect amplitudes of the plurality of second combined signals in order to produce a plurality of second amplitude signals, and to compare the plurality of first and second amplitude signals in order to produce a digital signal that indicates a region of a reference circle within which the relative phase difference occurs.

2. The apparatus of claim 1, wherein the plurality of phase shifters comprises a first set of two phase shifters, wherein the first set comprises:
    a first phase shifter adapted to apply a first phase shift, $\Phi_I$, to the representation of the incident signal during a first measurement interval to produce a first intermediate phase shifted signal, and to apply a second phase shift, $\Phi_{I'}$, to the representation of the incident signal during a second measurement interval to produce a second intermediate phase shifted signal; and
    a second phase shifter adapted to apply a third phase shift, $\Phi_R$, to the representation of the reflected signal to produce a third intermediate phase shifted signal, wherein the third phase shift, $\Phi_R$, is substantially 45 degrees out of phase with the first phase shift, $\Phi_I$, and the third phase shift is substantially equal to the second phase shift, $\Phi_{I'}$.

3. The apparatus of claim 2, wherein the plurality of phase shifters further comprises a second set of four phase shifters, operatively coupled with the first set of two phase shifters, wherein the second set of four phase shifters comprises:
    a third phase shifter adapted to apply a fourth phase shift to the first intermediate phase shifted signal during the first measurement interval, wherein the fourth phase shift is about −45 degrees out of phase with the third phase shift, $\Phi_R$, in order to produce a first one of the first phase shifted signals, and to apply the fourth phase shift to the second intermediate phase shifted signal during the second measurement interval, in order to produce a first one of the second phase shifted signals,
    a fourth phase shifter adapted to apply a fifth phase shift to the first intermediate phase shifted signal during the first measurement interval, wherein the fifth phase shift is about +45 degrees out of phase with the third phase shift, $\Phi_R$, in order to produce a second one of the first phase shifted signals, and to apply the fifth phase shift to the second intermediate phase shifted signal during the second measurement interval, in order to produce a second one of the second phase shifted signals,
    a fifth phase shifter adapted to apply a sixth phase shift to the third intermediate phase shifted signal, wherein the sixth phase shift is about +45 degrees out of phase with the third phase shift, $\Phi_R$, in order to produce a third one of the first phase shifted signals during the first measurement interval and a third one of the second phase shifted signals during the second measurement interval, and
    a sixth phase shifter adapted to apply a seventh phase shift to the third intermediate phase shifted signal, wherein the seventh phase shift is about −45 degrees out of phase with the third phase shift, $\Phi_R$, in order to produce a fourth one of the first phase shifted signals during the first measurement interval or a fourth one of the second phase shifted signals during the second measurement interval.

4. The apparatus of claim 2, wherein the first phase shifter is adapted first to apply the first phase shift, $\Phi_I$, of 45 degrees to the representation of the incident signal during the first measurement interval, and to apply the second phase shift, $\Phi_{I'}$, of 0 degrees to the representation of the incident signal during the second measurement interval, and the second phase shifter is adapted to apply the third phase shift, $\Phi_R$, of 0 degrees to the representation of the reflected signal during the first and second measurement intervals.

5. The apparatus of claim 1, wherein the plurality of combiners comprises:
    a first combiner adapted to combine a first pair of the plurality of the first phase shifted signals, which includes a first one and a third one of the first phase shifted signals, and wherein the first combiner is also adapted to combine a first pair of the plurality of the second phase shifted signals, which includes a first one and a third one of the second phase shifted signals, in order to produce a first one of the plurality of first combined signals and a first one of the plurality of second combined signals;
    a second combiner adapted to combine a second pair of the plurality of the first phase shifted signals, which includes the first one and a fourth one of the first phase shifted signals, and wherein the second combiner is also adapted to combine a second pair of the plurality of the second phase shifted signals, which includes the first one and a fourth one of the second phase shifted signals, in order to produce a second one of the plurality of first combined signals and a second one of the plurality of second combined signals;
    a third combiner adapted to combine a third pair of the plurality of the first phase shifted signals, which includes a second one and the third one of the first phase shifted signals, and wherein the third combiner is also adapted to combine a third pair of the plurality of the second phase shifted signals, which includes a second one and the third one of the second phase shifted signals, in order to produce a third one of the plurality of first combined signals and a third one of the plurality of second combined signals; and a fourth combiner adapted to combine a fourth pair of the plurality of the first phase shifted signals, which includes the second one and the fourth one of the first phase shifted signals, and wherein the third combiner is also adapted to combine a fourth pair of the plurality of the second phase shifted signals, which includes the second one and the fourth one of the second phase shifted signals, in order to produce a fourth one of the plurality of first combined signals and a fourth one of the plurality of second combined signals.

6. The apparatus of claim 1, wherein the additional circuitry comprises a plurality of detectors, and the plurality of detectors comprises:

a first detector adapted to detect an amplitude of a first one of the plurality of first combined signals to produce a first one of the first amplitude signals, and to detect an amplitude of a first one of the plurality of second combined signals to produce a first one of the second amplitude signals;

a second detector adapted to detect an amplitude of a second one of the plurality of first combined signals to produce a second one of the first amplitude signals, and to detect an amplitude of a second one of the plurality of second combined signals to produce a second one of the second amplitude signals;

a third detector adapted to detect an amplitude of a third one of the plurality of first combined signals to produce a third one of the first amplitude signals, and to detect an amplitude of a third one of the plurality of second combined signals to produce a third one of the second amplitude signals; and a fourth detector adapted to detect an amplitude of a fourth one of the plurality of first combined signals to produce a fourth one of the first amplitude signals, and to detect an amplitude of a fourth one of the plurality of second combined signals to produce a fourth one of the second amplitude signals.

7. The apparatus of claim 1, wherein the additional circuitry comprises a plurality of comparators, and the plurality of comparators comprises:

a first comparator adapted to compare a first pair of the first amplitude signals in order to produce a first digital value indicating a relative magnitude of the first pair of the first amplitude signals, and also to compare a first pair of the second amplitude signals in order to produce a second digital value indicating a relative magnitude of the first pair of the second amplitude signals; and a second comparator adapted to compare a first gain adjusted combination of the first pair of the first amplitude signals with a second gain adjusted combination of a second pair of the first amplitude signals in order to produce a third digital value indicating a relative magnitude of the first gain adjusted combination and the second gain adjusted combination, and also to compare a third gain adjusted combination of the first pair of the second amplitude signals with a fourth gain adjusted combination of a second pair of the second amplitude signals in order to produce a fourth digital value indicating a relative magnitude of the third gain adjusted combination and the fourth gain adjusted combination, wherein the first digital value, the second digital value, the third digital value, and the fourth digital value indicate the region of the reference circle within which the phase angle between the incident signal and the reflected signal occurs, and wherein the region is an octant of the reference circle.

8. The apparatus of claim 7, further comprising:

a first gain application element, operatively coupled to the second comparator, and adapted to produce the first gain adjusted combination and the second gain adjusted combination; and a second gain application element, operatively coupled to the second comparator, and adapted to produce the third gain adjusted combination and the fourth gain adjusted combination.

9. The apparatus of claim 1, wherein the reference circle is defined by eight octants, the region of the reference circle is an octant of the eight octants, and the digital signal produced by the plurality of comparators indicates one of the eight octants.

10. The apparatus of claim 1, wherein:

the incident signal is an incident radio frequency (RF) signal, and the reflected signal is a reflected RF, signal;

the plurality of phase shifters comprise a plurality of passive components adapted to apply phase shifts to RF signals; and the plurality of combiners comprise a plurality of passive components adapted to combine RF signals; and the additional circuitry comprises a plurality of passive components adapted to detect amplitudes of RF signals.

11. An apparatus for detecting a phase angle between an incident signal and a reflected signal, wherein the apparatus comprises:

a plurality of phase shifters adapted to apply first phase shifts to a representation of the incident signal and to apply second phase shifts to a representation of the reflected signal; and additional circuitry, operatively coupled to the plurality of phase shifters, and adapted to produce a first indication of a location of a relative phase difference between the incident signal and the reflected signal within a first quadrant of a first reference circle, and to produce a second indication of the location of the relative phase difference within a second quadrant of a second reference circle, wherein the second reference circle is rotated with respect to the first reference circle so that the first quadrant and the second quadrant are not aligned, and the first indication and the second indication are useful in determining an octant of a third reference circle within which the relative phase difference is located.

12. The apparatus of claim 11, wherein the second reference circle is rotated by 45 degrees with respect to the first reference circle.

13. The apparatus of claim 11, further comprising:

phase difference adjustment circuitry adapted to adjust a phase of the reflected signal with respect to the incident signal so that the relative phase difference occurs within a region of the third reference circle associated with improved performance.

14. The apparatus of claim 11, wherein the apparatus is a type of apparatus selected from a group of apparatus that includes a cellular telephone, a radio, a two-way pager, a personal data assistant, a computer, a satellite, a relay, a repeater, a remote control device, a wireless transmitter, and a wireless transceiver.

15. A method for detecting a relative phase difference between an incident signal and a reflected signal, the method comprising the steps of:

applying first phase shifts to a representation of the incident signal and to a representation of the reflected signal in order to produce a plurality of first phase shifted signals;

applying second phase shifts to the representation of the incident signal and to the representation of the reflected signal in order to produce a plurality of second phase shifted signals;

combining different pairs of the plurality of first phase shifted signals in order to produce a plurality of first combined signals;

combining different pairs of the plurality of second phase shifted signals in order to produce a plurality of second combined signals;

detecting amplitudes of the plurality of first combined signals in order to produce a plurality of first amplitude signals;

detecting amplitudes of the plurality of second combined signals in order to produce a plurality of second amplitude signals; and comparing the plurality of first and second amplitude signals in order to produce a digital signal that indicates a region of a reference circle within which the relative phase difference occurs.

16. The method of claim 15, wherein:
applying the first phase shifts includes applying +45 degree and −45 degree phase shifts to the representation of the incident signal and to the representation of the reflected signal; and
applying the second phase shifts applying +45 degree, −45 degree, and 90 degree phase shifts to the representation of the incident signal and to the representation of the reflected signal.

17. The method of claim 15, wherein the reference circle is defined by eight octants, the region of the reference circle is an octant of the eight octants, and the digital signal produced in the comparing step indicates one of the eight octants.

18. The method of claim 17, further comprising:
adjusting a phase of the incident signal, based on the digital signal, so that the relative phase difference occurs within an octant of the eight octants that results in higher power added efficiency of the incident signal.

19. The method of claim 15, wherein the reference circle is defined by plurality of regions, the region of the reference circle is one of the plurality of regions, and the digital signal produced in the comparing step indicates the one of the plurality of regions.

* * * * *